United States Patent [19]

Lucas

[11] Patent Number: 4,521,563
[45] Date of Patent: Jun. 4, 1985

[54] LOW TEMPERATURE CURE, PIGMENTED COATED COMPOSITION

[75] Inventor: Howard R. Lucas, Danbury, Conn.

[73] Assignee: American Cyanamid Company, Stamford, Conn.

[21] Appl. No.: 665,513

[22] Filed: Oct. 30, 1984

Related U.S. Application Data

[63] Continuation-in-part of Ser. No. 529,238, Sep. 6, 1983, abandoned.

[51] Int. Cl.³ .................. C08J 39/00; C08K 39/00
[52] U.S. Cl. ....................... 524/555; 525/328.2; 525/379; 525/381; 525/382; 526/304
[58] Field of Search ............ 525/328.2, 379, 381, 525/382; 524/555; 526/304

[56] References Cited

U.S. PATENT DOCUMENTS 4,303,563 12/1981 Emmons et al. ............... 525/328.2
4,446,280 5/1984 Cady et al. .................... 525/186

Primary Examiner—Paul R. Michl
Assistant Examiner—S. Babajko
Attorney, Agent, or Firm—Steven J. Hultquist; Henry C. Jeanette

[57] ABSTRACT

A low temperature cure, pigmented coating composition is provided. This coating composition includes a crosslinkable, solvent borne, solution polymer containing certain activated ester groups, and an amine/aminal equilibrium mixture. Also provided is a coating with improved gloss obtained by curing this pigmented composition.

12 Claims, 1 Drawing Figure

EFFECT OF KETONE IN REDUCING HAZE IN PIGMENTED COATINGS

LEGEND
△ NO PIGMENT
× TiO2
☐ TiO2-MIBK
⊠ CLEAR-MIBK

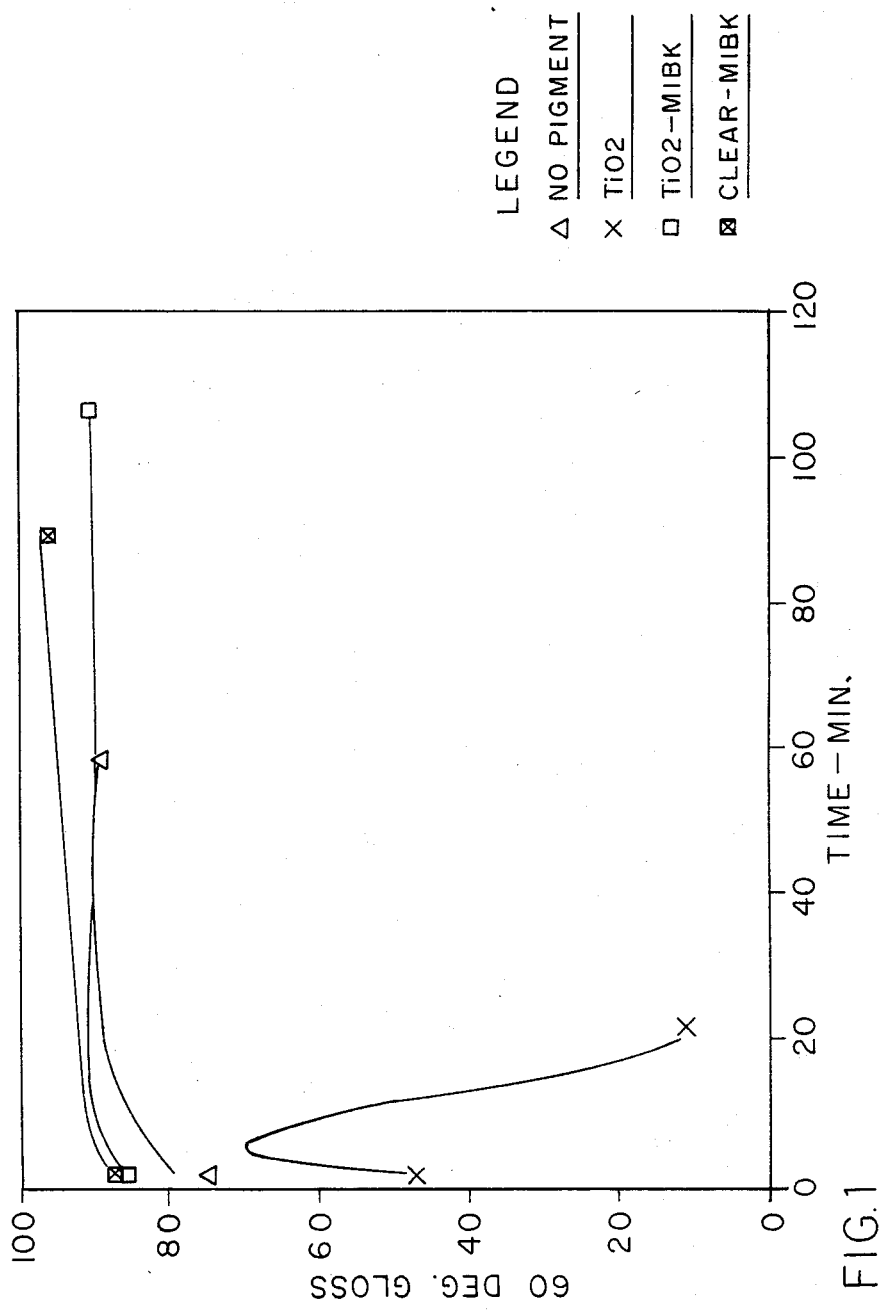

LOW TEMPERATURE CURE, PIGMENTED COATED COMPOSITION

REFERENCE TO RELATED APPLICATION

This is a continuation-in-part of copending application, Ser. No. 529,238, filed, Sept. 6, 1983, now abandoned.

TECHNICAL FIELD

This invention relates to low temperature cure thermoset resins. More particularly, this invention relates to a pigmented coating composition based upon a crosslinkable, solvent borne, solution polymer containing activated ester groups. The present invention further relates to a coating with improved gloss formed from the pigmented composition.

BACKGROUND ART

Low temperature cure coating compositions based on crosslinkable, solvent borne, solution polymers containing activated ester groups, as illustrated by U.S. Patent Application Ser. No. 346,329, filed Feb. 5, 1982, now abandoned and U.S. Pat. Application Ser. No. 377,504, filed May 12, 1982, now U.S. Pat. No. 4,446,250 are known to me. A disadvantage of a coating composition of this type is that coatings must be applied within minutes of mixing to obtain high gloss in pigmented systems.

Also known to me is a prior invention disclosed and claimed in copending application U.S. Ser. No. 529,235, filed Sept. 6, 1983, in the names of D. A. Ley and S. Cady, and directed to a low temperature cure coating composition with improved pot life. This coating composition is based upon an activated ester group-containing, solution polymer and a hemiaminal. The hemiaminal is formed from a volatile ketone and a crosslinking agent having nucleophilic primary amine groups. However, this work is directed to a clear coating composition.

The activated ester group-containing solution polymer based clear coating compositions, either with or without a hemiaminal, yield coatings having good gloss. However, the addition of pigment—e.g., $TiO_2$—to nonhemiaminal coating compositions of such type results in substantially increased viscosity with a correspondingly short pot life. Such compositions in turn yield coatings with hazing problems which result in a significantly decreased gloss of the coating.

Hence, there has existed a continuing need for a low temperature cure, pigmented coating composition, based upon activated ester-group containing solution polymers, that provide coatings whose gloss is (a) as good as the corresponding unpigmented (clear base) composition, and (b) significantly better than pigmented compositions not containing a hemiaminal. Therefore, the provision of such a pigmented composition would constitute a significant advance in the art.

SUMMARY OF THE INVENTION

It is accordingly an object of the present invention to provide a low temperature cure, pigmented coating composition that provides coatings having improved gloss, in which the coating composition is based upon a solvent borne, solution polymer.

A further object is to provide a coating with improved gloss obtained by curing this pigmented composition.

Additional objects, advantages and novel features of the invention will be set forth in the description which follows, and in part will become apparent to those skilled in the art upon examination of the following or may be learned by practice of the invention.

To achieve the foregoing objects and in accordance with the purpose of the present invention, as embodied and broadly described herein, there is provided a low temperature cure, pigmented coating composition. This coating composition includes a particular crosslinkable, solvent borne, solution polymer, and a certain amine/aminal equilibrium mixture. The polymer contains from about 1 to 100 wt. % of repeating units derived from an activated ester-containing vinyl monomer of the formula

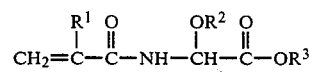

in which the $R^1$ group is selected from H and $CH_3$, the $R^2$ group is selected from alkyls of 1–6 carbon atoms, cycloalkyls of 5–6 carbon atoms, and 2-hydroxyalkyls of 2–6 carbon atoms, and the $R^3$ group is selected from alkyls of 1–6 carbon atoms, cycloalkyls of 5–6 carbon atoms, and 2-hydroxyalkyls of 2–6 carbon atoms. Any balance of repeating units making up the polymer is derived from one or more copolymerizable ethylenically unsaturated comonomers.

In the amine/aminal equilibrium mixture, the equilibrium is between a crosslinking agent having a plurality of primary amine groups, each capable when in the free amine form of replacing the $OR_3$ moiety by nucleophilic substitution, and a hemiaminal formed from a hemiaminal-forming volatile ketone and the crosslinking agent. The hemiaminal is present in an amount sufficient to produce a crosslinked polymer when the nucleophilic primary amine groups are in the free amine form. The coating composition contains a sufficient amount of pigment for a coating prepared therefrom to manifest improved gloss. This pigmented composition provides coatings with surprisingly improved gloss. Also provided by the present invention is a coating with improved gloss obtained by curing the pigmented composition.

The term "hemiaminal based" as used herein means the composition from which the coating is derived contains a hemiaminal.

The term "nonhemiaminal based" as used herein means the composition form which the coating is derived contains a crosslinking agent having nucleophilic primary amine groups but no hemiaminal—i.e., a hemiaminal-forming volatile ketone is not utilized.

The term "improved gloss" as used herein means that a hemiaminal based pigmented coating composition yields a coating having a higher 60° Gardner Gloss than a comparative coating from a nonhemiaminal based pigmented coating composition. In the case of $TiO_2$ pigmented compositions of this invention "improved gloss" denotes a 60° Gardner Gloss of greater than 75, preferably greater than 85.

BRIEF DESCRIPTION OF THE FIGURE

The FIGURE demonstrates the effect of a hemiaminal in the coating composition on a coating's 60° Gardner Gloss.

DETAILED DESCRIPTION

In the figure:

"△ NO PIGMENT" represents the clear coating composition of Comparative Example 1. This composition does not contain hemiaminal.

"X TiO2" represents the titanium dioxide pigmented composition of Comparative Example 1. This composition does not contain hemiaminal.

"☐ TiO2-MIBK" represents the titanium dioxide coating composition of Example 1. This composition contains a hemiaminal derived from MIBK (methyl isobutyl ketone).

"⊠ CLEAR-MIBK" represents the clear coating composition of Example 1. This composition contains a hemiaminal derived from MIBK.

As explained earlier, a low temperature cure, clear coating composition is known to me. This coating composition is based upon a solvent borne, solution polymer containing activated ester groups, in admixture with a hemiaminal. This clear coating composition has improved pot life, but no dramatic improvement in gloss is seen when comparing a coating prepared from this composition with a coating prepared from a composition that is identical except it contains the crosslinking agent in free form, i.e., a hemiaminal has not been formed from the crosslinking agent.

Unexpectedly, I have found that the gloss of a coating prepared from the pigmented composition of the present invention, is surprisingly much better than the gloss of a coating made from the corresponding pigmented composition containing the crosslinking agent with the nucleophilic primary amine groups thereof in the free amine form.

The essential components of the pigmented composition of the present invention include a solvent borne, solution polymer bearing particular activated ester groups, and a certain amine/aminal equilibrium mixture. A necessary feature of the polymer is the presence of from about 1 to 100 wt. % of repeating units derived from an activated ester group-containing vinyl monomer of the formula

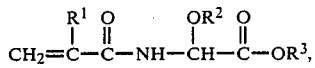

wherein $R^1$ group is selected from H and $CH_3$, the $R^2$ group is selected from alkyls of 1-6 carbon atoms, cycloalkyls of 5-6 carbon atoms, and 2-hydroxyalkyls of 2-6 carbon atoms, and the $R^3$ group is selected from alkyls of 1-6 carbon atoms, cycloalkyls of 5-6 carbon atoms, and 2-hydroxyalkyls of 2-6 carbon atoms. It is preferred for the polymer to contain about 20-35 wt. % of these repeating units.

Suitable monomers include methyl acrylamidoglycolate methyl ether (MAGME), ethyl acrylamidoglycolate ethyl ether, butyl acrylamidoglycolate butyl ether, methyl acrylamidoglycolate ethyl ether and ethyl acrylamidoglycolate methyl ether, with MAGME being preferred. Of course, the monomer could be a mixture of monomers such as a liquid mixture of MAGME, butyl acrylamidoglycolate methyl ether, methyl acrylamidoglycolate butyl ether and butyl acrylamidoglycolate butyl ether, with, for example, the major portion of the mixture being MAGME with an overall methyl/butyl ratio of about 3:1. A highly preferred polymer contains about 20-35 wt. % of repeating units derived from MAGME.

These monomers are suitably formed by the procedures set forth in U.S. Patent Application Ser. No. 346,329, which is discussed earlier, U.S. Patent Application Ser. No. 377,505, filed May 12, 1982, now U.S. Pat. No. 4,443,623 and U.S. Patent Application Ser. No. 377,506, also filed May 12, 1982, the monomer-forming procedures of which are hereby incorporated by reference into this description. Additionally, attention is invited to two illustrative procedures set forth later in the description of the present invention.

In my pigmented coating composition, there is an amine/aminal equilibrium mixture. This mixture results from using a certain type of ketone to react with the nucleophilic primary amine groups of the crosslinking agent, thereby forming a hemiaminal. Hemiaminal formation is reversible, and thus the coating composition contains typically a small amount of the primary amine groups in the free amine form. After film formation, the equilibrium shifts toward the free amine form as the ketone rapidly evaporates from the film, as a result of which rapid cure occurs.

The hemiaminal is formed from a certain type of ketone and from a crosslinking agent having a plurality of primary amine groups. Each of these amine groups is capable when in the free amine form of replacing the $OR^3$ moiety by nucleophilic substitution. The ketone must be sterically capable of forming the hemiaminal and must volatilize under low temperature cure conditions. Typical low to moderate boiling ketones are suitable, with unbranched ketones of this type being preferred. Exemplary ketones include acetone, methyl ethyl ketone, methyl butyl ketone, methyl isobutyl ketone, methyl amyl ketone, cyclohexanone, and 4-heptanone.

Conveniently, the crosslinking agent has two to four primary amine groups available for crosslinking, and is typically a diamine or a trifunctional amine. Illustrative amines include 1,3-bis(aminomethyl)cyclohexane, 1,4-bis(aminomethyl)cyclohexane, m-xylenediamine, 1,3-propanediamine, 1,6-hexanediamine, 4,7-dioxodecane-1,10-diamine, 1,2-cyclohexanediamine, bis(3-aminopropyl)diethylene glycol, and an amine-terminated triazine resin.

The triazine resin is conveniently obtained according to the procedures set forth in U.S. Patent Application Ser. No. 377,504, filed May 12, 1982, the triazine resin-forming procedures of which are hereby incorporated by reference into this description. In this regard, the resin is obtained by either melt condensation of the aminotriazine compound with the amine in the presence of an acid catalyst at temperatures of 120° to 250° C. or by reaction of the chloride (such as cyanuric chloride) with the amine in the presence of an acid scavenger. Examples are given in U.S. Pat. No. 2,393,755 and in E. M. Smolin and L. Rapport, "s-Triazine and Derivatives" in "The Chemistry of Heterocyclic compounds, a series of Monographs", A. Weissberger, Editor, Interscience Publishers, Inc., New York, 1959.

The preferred crosslinker is N,N'-bis(6-aminohexyl)-2-[(6-aminohexyl)amino] butanediamide, a sterically unhindered trifunctional primary amine. This compound is best prepared by the following procedure:

Dimethyl maleate (72 g, 0.5 moles) is added over a 2-3 hour period to a solution of 1,6-hexanediamine (174 g, 1.5 moles) in toluene (360 g) at 75°–80° C. The reaction temperature rises from 80° to 110° C. under reflux conditions. After the addition is completed, methanol is distilled at a reaction temperature of 120°–125° C. Additional toluene (320 g) is added to maintain reaction volume. The reaction may be followed by amine titration or by disappearance of the methyl ester in the $^1$H NMR spectrum. After the reaction is complete, toluene is removed under vacuum (50°–70° C., 15–20 mm Hg) to give the desired compound as a viscous liquid which solidifies on standing.

The crosslinker is employed in the composition in an amount sufficient to create a crosslinked polymer, when in the free amine form. The amount of the crosslinker may vary widely and is generally determined by a number of factors such as the extent of crosslinking desired and the particular reactants employed. Generally, the primary amine groups of the crosslinker in the composition will range from about 0.5 to 10 equivalents based on the activated ester functionality of the polymer employed. Preferably, about 0.8 to 1.2 equivalents of amine groups are used.

The ketone and the crosslinker may be mixed together to form the hemiaminal in a ratio ranging from about 1:1 to about 10:1 equivalents of the ketone to the crosslinker, with an about 2:1 to 3:1 ratio being convenient.

As explained, the polymer contains from about 1–100 weight percent of repeating units derived from the activated ester-containing vinyl monomer. Any balance of repeating units is derived from one or more copolymerizable ethylenically unsaturated monomers. Such monomers include $C_1$–$C_{18}$, preferably $C_1$–$C_8$, alkyl esters of acrylic acid, $C_1$–$C_{18}$, preferably $C_1$–$C_8$ alkyl esters of methacrylic acid, styrene, acrylonitrile, maleic and fumaric acids, and functional acrylates such as 2-hydroxyethylacrylate, acrylic acid and acrylamide.

Conveniently, the activated ester-containing monomer may be polymerized, or more preferably copolymerized with these other monomers, by the polymerization techniques set forth in U.S. Patent Application Ser. No. 377,504, which is discussed earlier, the polymer-forming procedures of which are hereby incorporated by reference into this description. Attention is also invited to the illustrative procedures set forth below in the description of the present invention.

The pigment is used in widely varying amounts depending upon, for example, the hiding power of the pigment selected. However, in any event, the pigment is used in a sufficient amount for a coating prepared from the pigmented composition of the present invention to manifest improved gloss. By "improved" is meant that the gloss is superior relative to the gloss of a coating prepared from a composition that is identical except that the composition does not have added thereto the hemiaminal-forming ketone or a hemiaminal formed from the ketone, and thus contains the crosslinking agent with the nucleophilic primary amine groups thereof in the free amine form. Typically, improved gloss is demonstrated by a 60° gloss value of about 85 or higher.

An illustrative pigment is titanium dioxide. The coating composition of the present invention generally will contain this pigment in a ratio of about 0.6 to 0.9 parts of pigment to about 1 part of binder. By "binder" is meant the polymer backbone and the crosslinker.

My pigmented coating composition is preferably made by combining the ketone with the crosslinker, and then blending the resulting mixture with the crosslinkable polymer. Alternatively, the crosslinking agent could be combined with the polymer prior to addition of the ketone. The pigment is conveniently added to the polymer prior to blending the polymer with the crosslinker or hemiaminal.

The crosslinkable polymer is cured by reaction with the unblocked crosslinking agent described earlier, under low temperature cure conditions. By "low temperature" is meant from about ambient temperature up to and including about 50° C., and, in certain instances, up to and including about 100° C.

The composition of the present invention is readily cured as a coating, by exposure to an appropriate low temperature for an adequate period of time. The speed of curing depends upon factors including the particular temperature at which curing is carried out, the components forming the composition, and the presence or absence of an accelerator.

The composition of the present invention may contain such other ingredients as are customarily employed in coating compositions. Such ingredients include polymer solvents, and flow additives and modifiers.

The compositions of the present invention are useful as general purpose coatings, as well as coatings in automotive, decorative and paper applications. As automotive coatings, the compositions may be used as topcoat and repair coatings.

In the illustrative procedures which follow, all parts and percentages are by weight unless otherwise specified.

PREPARATION OF ACTIVATED ESTER GROUP-CONTAINING MONOMERS

Preparation of Methyl Acrylamidoglycolate Methyl Ether (MAGME)

To a three-necked flask equipped with a stirrer and an extractor filled with a molecular sieve drying agent is added 300 parts acrylamidoglycolic acid, 3000 parts methanol, 0.05 parts phenothiazine, 4.5 parts 98% sulfuric acid and 200 parts chloroform. The mixture is heated to reflux and the distillate is allowed to pass through the extractor for 6½ hours. The mixture is cooled and allowed to stand for 16 hours at which point the mixture is warmed to about 40° C., 19 g of sodium carbonate is added, and the solution is stirred for 2½ hours. The mixture is filtered and vacuum stripped of solvent. The solid residue is extracted with chloroform. Diethyl ether is added to the extract and a polymeric mass precipitates which is discarded. The remaining extract is stripped of solvent to yield 264.2 parts of crude MAGME.

Preparation of Butyl Acrylamidoglycolate Butyl Ether

One hundred parts of acrylamidoglycolic acid, 517 parts butanol, 1 part conc. sulfuric acid and 0.1 part monomethyl ether of hydroquinone are mixed in a flask equipped with a Dean Stark water trap and a stirrer. The mixture is heated until homogeneous. After 5–10 minutes, 100 ml of toluene is added and the mixture is brought to reflux and held 5 hours until the theoretical amount of water is collected by azeotrope. The toluene and excess butanol are removed under vacuum to yield 173 parts of the crude product.

PREPARATION OF POLYMERS

Polymer A

Methyl acrylamidoglycolate methyl ether, in the amount of 160 parts, is dissolved in 312 parts absolute ethanol and 342 parts toluene. To this are added 20 parts acrylic acid, 248 parts butyl acrylate, 396 parts methyl methacrylate, 8 parts n-dodecyl mercaptan and 21 parts t-butylperoxyisobutyrate. The monomer mixture is placed in a dropping funnel and purged with nitrogen for 20 minutes. Toluene, 80 parts, is placed in a flask and heated to 85° C. The monomer mixture is added slowly to the flask over a 2-hour period. The reaction mixture is held at 83° C. for an additional 3-hour period. The resulting polymer solution is filtered hot through a preheated pressure funnel using filter aid. After cooling, the polymer is ready for use.

The polymer has the following characteristics: clear yellow color, dish solids (2 hours at 105° C.) 54.9% non-volatiles, and Brookfield viscosity (20 rpm, #2 spindle) 832 centipoises.

Polymer B

The procedure used for Polymer A is again followed except that the reactants are as follows:

| | |
|---|---|
| methyl acrylamidoglycolate methyl ether | 60 parts |
| methacrylic acid | 10 parts |
| butyl acrylate | 132 parts |
| methyl methacrylate | 206 parts |
| t-butylperoxyisobutyrate | 10.6 parts |
| ethanol | 154 parts |
| toluene | 211 parts |

The resulting polymer is a clear, yellow liquid with dish solids of 53.6% non-volatiles.

Polymer C

To a flask equipped with a stirrer, condenser, nitrogen inlet and thermometer are added 100 parts ethyl acrylamidoglycolate ethyl ether dissolved in 252 parts toluene, 64 parts butyl acrylate, 116 parts methyl methacrylate, 7.2 parts methacrylic acid and 5.76 parts azobisisobutyrylnitrile. The solution is purged with nitrogen for 30 minutes and heated to 83° C. for 2½ hours.

The resulting polymer is a clear yellow liquid with dish solids of 49.2% non-volatiles.

Polymer D

The procedure used for Polymer A is again followed except that the reactants are as follows:

| | |
|---|---|
| mixed alkyl acrylamidoglycolate alkyl ether | 200 parts |
| acrylic acid | 20 parts |
| butyl acrylate | 234 parts |
| methyl methacrylate | 142 parts |
| styrene | 204 parts |
| N—dodecylmercaptan | 16 parts |
| t-butylperoctoate | 16 parts |
| ethanol | 244 parts |
| toluene | 330 parts |

The mixed alkyl acrylamidoglycolate alkyl ether is a liquid composition consisting of the following: methyl acrylamidoglycolate methyl ether, butyl acrylamidoglycolate methyl ether, methyl acrylamidoglycolate butyl ether, and butyl acrylamidoglycolate butyl ether, the major portion being the methyl ester/methyl ether compound with an overall methyl/butyl ratio of about 3/1. The resulting polymer is a clear yellow liquid with dish solids of 58.3% non-volatiles.

PREPARATION OF HEMIAMINALS

Hemiaminal A

To 274 g of a 50% solution of N,N'-bis(6-aminohexyl)-2-[(6-aminohexyl)amino] butanediamide in ethanol, there is added at room temperature 400 g of methyl isobutyl ketone. Initially, the amine precipitates from solution, but redissolves as the hemiaminal is formed.

Hemiaminal B

With 24 g of 1,6-hexamethylenediamine, there is reacted at room temperature 259.6 g of methyl isobutyl ketone to form a solution of the hemiaminal.

Hemiaminal C 14.8 Grams of 1,4-bis(aminomethyl)cyclohexane is reacted with 132 g of methyl isobutyl ketone at room temperature to produce a solution of the hemiaminal.

EXAMPLE 1

To 180 g of a polymer made of 25 wt. % MAGME, 30.6 wt. % butyl acrylate, 29.2 wt. % methyl methacrylate, 12.6 wt. % styrene and 2.6 wt. % acrylic acid, and containing 50.8% solids, there is added 180 g of titanium dioxide and 30 g of Cellosolve ®, a product of Union Carbide having the chemical name 2-ethoxyethanol. The charge is blended on a three roll mill, and then let down with an additional 163 parts of the polymer solution to give a paint containing 60.7% solids.

To 90 g of this titanium dioxide-pigmented acrylic polymer, which contains 46.3 meq/g MAGME, there is added 33.7 g (46.3 meq/g) of Hemiaminal A.

A clear hemiaminal based coating composition was prepared from 150 g of the unpigmented acrylic polymer of this example, 31.1 g of the butanediamide (described under "Hemiaminal A" above) and 22.0 g of methyl isobutyl ketone.

The viscosity is measured and coatings are prepared at the intervals of time shown in the Table, and gloss measurements are made. The results are shown in the Table.

COMPARATIVE EXAMPLE 1

With another 90 g of the titanium dioxide-pigmented acrylic polymer of Example 1, there is mixed a solution of 6.9 g (46.3 meg/g) of the butanediamide (from which Hemiaminal A was prepared) in 6.9 g of ethanol and 20 g of toluene.

A clear nonhemiaminal based coating composition was prepared from 150 g of the unpigmented acrylic polymer of Example 1 and 31.1 g of the aforementioned butanediamide.

The viscosity is measured and coatings are prepared at the intervals of time shown in the Table, and gloss measurements are recorded. The resulting data are set forth in the Table.

In the Table, "Gloss" is the 60° Gardner Gloss measured with a 60° Gardner Gloss meter used in accordance with ASTM D-523 specular gloss test method. The units of "Viscosity" is CPS and the viscosity was measured by the Brookfield Viscosity test. "Time Till Cast" is measured in minutes.

These data show that the coatings produced from the hemiaminal based pigmented composition of the present invention display a high Gloss value (>85), at up to six hours Time Till Cast, with the coating composition viscosity remaining less than 1400 CPS up to such point in time. By contrast, the coatings produced from the nonhemiaminal based pigmented compositions display a significantly decreased Gloss value (11) after 22 minutes Time Till Cast, with the coating composition viscosity increasing to 7200 CPS up to such point in time.

The data in the Table also demonstrates that the Gloss of the coating from the hemiaminal based pigmented compositions of this invention are as good as the Gloss of the coatings derived from clear hemiaminal or clear nonhemiaminal based coating compositions.

than 24 hours and gives coatings having 60° gloss values less than 10.

EXAMPLE 3

A coating formulation is made in the same manner as in Example 2 except that 50 parts of the pigmented acrylic polymer is combined with 1.5 parts of 1,4-bis-(aminomethyl)cyclohexane in 13 parts of methyl isobutyl ketone.

COMPARATIVE EXAMPLE 3

The procedure of Example 3 is followed except that 50 parts of the pigmented acrylic polymer is combined

| NONHEMIAMINAL VS HEMIAMINAL BASED COATING COMPOSITIONS | | | | | | | |
|---|---|---|---|---|---|---|---|
| | Comparative Example 1 - Nonhemiaminal Based | | | | Example 1 - Hemiaminal Based | | |
| Time Till | Clear | | Pigmented | | Clear | | Pigmented | |
| Cast | Gloss | Viscosity | Gloss | Viscosity | Gloss | Viscosity | Gloss | Viscosity |
| 2 | 75 | 240 | 47 | 440 | — | — | 86 | 460 |
| 4 | 82 | 245 | 68 | — | — | — | 88 | — |
| 5 | — | — | — | — | 91 | 379 | — | — |
| 6 | 85 | 260 | — | — | — | — | 93 | — |
| 8 | — | — | 65 | 920 | — | — | — | — |
| 10 | 86 | — | 59 | 1400 | 92 | 409 | 92 | 500 |
| 12 | — | — | 52 | — | — | — | — | — |
| 14 | 88 | — | 32 | 2600 | — | — | — | — |
| 15 | — | — | — | — | 93 | 424 | — | — |
| 16 | — | — | 28 | — | — | — | — | — |
| 18 | 88 | 310 | 16 | 4300 | — | — | — | — |
| 20 | — | — | 13 | — | 93 | 443 | — | — |
| 21 | — | — | 11 | — | — | — | 90 | — |
| 22 | — | — | 11 | 7200 | — | — | — | — |
| 24 | 89 | 352 | — | — | — | — | — | — |
| 30 | — | — | — | 27760 | 94 | 468 | — | — |
| 34 | 88 | 450 | — | — | — | — | — | — |
| 42 | — | — | — | — | — | — | 90 | 560 |
| 44 | 91 | 618 | — | — | — | — | — | — |
| 45 | — | — | — | — | 95 | 498 | — | — |
| 54 | 89 | 963 | — | — | — | — | — | — |
| 59 | 89 | 1250 | — | — | — | — | — | — |
| 60 | — | — | — | — | 95 | 525 | — | — |
| 75 | — | — | — | — | 95 | 548 | — | — |
| 90 | — | — | — | — | 96 | 568 | — | — |
| 107 | — | — | — | — | — | — | 90 | 680 |
| 242 | — | — | — | — | — | — | 90 | 900 |
| 360 | — | — | — | — | — | — | 90 | 1320 |

EXAMPLE 2

To 180 g of a polymer made of 20 wt. % MAGME, 40 wt. % butyl acrylate, 17.5 wt. % methyl methacrylate, 20 wt. % styrene and 2.5 wt. % acrylic acid, and containing 50.5% solids, there is added 180 g of titanium dioxide and 30 g of Cellosolve ®. The charge is blended on a three roll mill, and then let down with an additional 163 parts of the polymer solution to give a paint. With 50 parts of this pigmented acrylic polymer, there is mixed 1.2 parts of 1,6-hexamethylenediamine in 13 parts of methyl isobutyl ketone.

COMPARATIVE EXAMPLE 2

A coating formulation is prepared in the same way as in Example 2 except that 50 parts of the pigmented acrylic polymer is mixed with 1.2 parts of 1,6-hexamethylenediamine in 13 parts of toluene.

Comparison between the formulations of Example 2 and Comparative Example 2 shows that the Example 2 formulation is stable for over two months and produces coating with 60° gloss values over 90; whereas, the Comparative Example 2 formulation is stable for less with 1.5 parts of the amine in 13 parts of toluene.

Comparison between the formulations of Example 3 and Comparative Example 3 shows that the Example 3 formulation is stable for two months and produces coatings with 60° gloss values of 90; whereas, the Comparative Example 3 formulation gels in less than 24 hours and produces coatings with low 60° gloss values.

EXAMPLE 4

To 20 parts of a pigmented acrylic polymer (25% MAGME, 30% methylmethacrylate, 32.5% butyl acrylate and 2.5% acrylic acid; 67.8% total solids, 35.6% polymer, 32% titanium dioxide) is added a solution of 3.5 parts of N,N'-bis(6-aminohexyl)-2-[(6-aminohexyl)amino] butanediamide and 2.7 parts methyl ethyl ketone. The resulting composition is coated onto pretreated steel panels and cured for 20 minutes at 100° C.

EXAMPLE 5

The procedure of Example 4 is followed except that 2.7 parts of methyl isobutyl ketone is used in place of methyl ethyl ketone. Comparison between the formulations of Examples 4 and 5 will show very similar gloss values but, for Example 4, a film which is more than 5 Knoop hardness units harder than that of Example 5.

The above examples are illustrative of my invention. It is to be understood that these examples are not in any way to be interpreted as limiting the scope of the invention. Rather, it is intended that the scope of the invention be defined by the claims set forth below.

I claim:

1. A low temperature cure, pigmented coating composition comprising (a) a crosslinkable, solvent borne, solution polymer containing from about 1 to 100 weight percent of repeating units derived from an activated ester-containing vinyl monomer of the formula

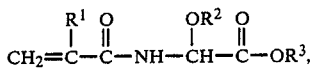

wherein the $R^1$ group is selected from H and $CH_3$, the $R^2$ group is selected from alkyls of 1–6 carbon atoms, cycloalkyls of 5–6 carbon atoms, and 2-hydroxyalkyls of 2–6 carbon atoms, and the $R^3$ group is selected from alkyls of 1–6 carbon atoms, cycloalkyls of 5–6 carbon atoms, and 2-hydroxyalkyls of 2–6 carbon atoms; with any balance of repeating units derived from one or more copolymerizable ethylenically unsaturated comonomers; combined with (b) an amine/aminal equilibrium mixture, the equilibrium being between a crosslinking agent having a plurality of primary amine groups, each capable when in the free amine form of replacing the $OR^3$ moiety by nucleophilic substitution, and a hemiaminal formed from a hemiaminal-forming, volatile ketone and said crosslinking agent; said hemiaminal being present in an amount sufficient to produce a crosslinked polymer when said primary amine groups are in said free amine form;

wherein the coating composition contains a sufficient amount of pigment for a coating prepared therefrom to manifest improved gloss.

2. The coating composition of claim 1, wherein the polymer contains about 20–35 weight percent of said repeating units derived from said activated ester-containing vinyl monomer.

3. The coating composition of claim 1, wherein said activated ester-containing vinyl monomer is methyl acrylamidoglycolate methyl ether.

4. The coating composition of claim 1, wherein the polymer contains about 20–35 weight percent of repeating units derived from methyl acrylamidoglycolate methyl ether.

5. The coating composition of claim 1, wherein said crosslinking agent has three primary amine groups.

6. The coating composition of claim 1, wherein said crosslinking agent has two primary amine groups.

7. The coating composition of claim 5, wherein said crosslinking agent is N,N'-bis(6-aminohexyl)-2-[(6-aminohexyl)amino] butanediamide.

8. The coating composition of claim 1, wherein the ketone is an unbranched ketone.

9. The coating composition of claim 1, wherein the pigment is titanium dioxide.

10. A coating with improved gloss obtained by curing the pigmented composition of claim 1.

11. The coating of claim 10, having a 60° gloss value of about 85 or higher.

12. A method for producing a low temperature cured pigmented coating having good gloss comprising applying the composition of claim 1 to a substrate and curing same.

* * * * *